US008742066B2

(12) United States Patent
Adkinson et al.

(10) Patent No.: US 8,742,066 B2
(45) Date of Patent: Jun. 3, 2014

(54) RECYCLED BUTYL IONOMERS AND RECYCLING PROCESSES

(75) Inventors: Dana Adkinson, London (CA); Rayner Krista, Strathroy (CA); Kevin Kulbaba, Leverkusen (DE)

(73) Assignee: LANXESS International S.A., Granges-Paccot (CH)

( * ) Notice: Subject to any disclaimer, the term of this patent is extended or adjusted under 35 U.S.C. 154(b) by 237 days.

(21) Appl. No.: 13/201,507

(22) PCT Filed: Feb. 5, 2010

(86) PCT No.: PCT/CA2010/000158
§ 371 (c)(1),
(2), (4) Date: Nov. 22, 2011

(87) PCT Pub. No.: WO2010/091498
PCT Pub. Date: Aug. 19, 2010

(65) Prior Publication Data
US 2012/0059074 A1 Mar. 8, 2012

Related U.S. Application Data

(60) Provisional application No. 61/152,419, filed on Feb. 13, 2009.

(51) Int. Cl.
*C08J 3/00* (2006.01)
(52) U.S. Cl.
USPC ........ 528/480; 528/481; 528/502 F; 528/503; 521/45.5; 524/574
(58) Field of Classification Search
USPC .................. 528/480, 481, 502 R, 502 F, 503; 521/40, 40.5, 41, 41.5, 42, 45.5; 524/414, 571, 574
See application file for complete search history.

(56) References Cited

U.S. PATENT DOCUMENTS

| | | | |
|---|---|---|---|
| 2,356,128 | A | 8/1944 | Thomas et al. |
| 3,646,166 | A | 2/1972 | Canter et al. |
| 3,898,253 | A | 8/1975 | Buckler et al. |
| 4,102,876 | A | 7/1978 | Brenner et al. |
| 4,173,695 | A | 11/1979 | Brenner et al. |
| 5,162,445 | A | 11/1992 | Powers et al. |
| 6,960,632 | B2 | 11/2005 | Kaszas |
| 2008/0207815 | A1 | 8/2008 | Resendes et al. |
| 2009/0182095 | A1 | 7/2009 | Resendes et al. |

FOREIGN PATENT DOCUMENTS

| | | |
|---|---|---|
| CA | 2418884 A1 | 8/2004 |
| CA | 2604409 A1 | 6/2008 |
| EP | 1591480 A1 | 11/2005 |
| EP | 1835004 A1 | 9/2007 |
| EP | 1942136 A1 | 7/2008 |
| WO | 2007/022619 A1 | 3/2007 |

OTHER PUBLICATIONS

International Search Report from co-pending Application PCT/CA2010/000158 dated Feb. 13, 2009, 3 pages.
Kaszas G., et al., Synthesis, Bromination and Cure of Isobutylene/Isoprene/P-Methystyrene and Isobutylene/Isoprene/Styrene Terpolymers, Rubber Chem. Technol. 75, 155 (2002) 15 pages (Abstract).
Morton, Maurice; "Rubber Technology" 3rd Ed. pp. 297-300.
Parent, J. Scott et al; Ion-Dipole Interaction Effects in Isobutylene-Based Ammonium Bromide Ionomers; Journal of Polymer Science, Part A, Polymer Chemistry, vol. 43, pp. 5671-5679.
Parent, J. Scott et al.; "Isobutylene-based ionomer composites: siliceous filler reinforcement", Polymer 45 (2004) pp. 8091-8096.
Parent et al.; "Synthesis and Characterization of Isobutylene-Based Ammonium and Phosphonium Bromide Ionomers" Molecules 2004, 37, pp. 7477-7483.
Vinodh, R., et al.; "Synthesis, Characterization and Antimicrobial Activity of Novel Quaternized Poly (Styrene Ethylene Butylene Poly Styrene)", J Biosci Tech, vol. 1 (1), 2009, pp. 45-51.
Encyclopedia of Polymer Science and Engineering, vol. 4, Composites, Fabrication to Die Design; "Compounding", pp. 66-79.
Ullmann's Encyclopedia of Industrial Chemistry, Fifth, Completely Revised Edition, vol. A23, pp. 287-295.
Supplementary European Search Report from co-pending Application EP10740863 dated Jul. 11, 2012, 2 pages.
Ultimate Tensile Strength, Wikipedia Foundation, Inc., retrieved on Feb. 5, 2014 from the Internet at http://en.wikipedia.org.
State Intellectual Property Office of P.R.C., First Office Action of co-pending Chinese application number 201080016272.0 filed Feb. 5, 2010, mailing date of Sep. 28, 2012.
State Intellectual Property Office of P.R.C., Second Office Action of co-pending Chinese application number 201080016272.0 filed Feb. 5, 2010, mailing date of Jul. 18, 2013.

*Primary Examiner* — Frances Tischler
(74) *Attorney, Agent, or Firm* — Jennifer R. Seng

(57) ABSTRACT

The present invention relates to processes for recycling articles made from butyl ionomers and processes for producing recycled butyl ionomers. The invention further relates to composites comprising recycled butyl ionomers and fillers and articles made from recycled butyl ionomers. The invention also relates to uncured filled articles made from butyl ionomers having certain physical properties. Exemplary fillers include silica, carbon black, talc and clay, particularly onium substituted high aspect ratio nanoclays.

11 Claims, No Drawings

RECYCLED BUTYL IONOMERS AND RECYCLING PROCESSES

FIELD OF THE INVENTION

The present invention relates to processes for recycling articles made from butyl ionomers and processes for producing recycled butyl ionomers. The invention further relates to composites comprising recycled butyl ionomers and fillers and articles made from recycled butyl ionomers. The invention also relates to uncured filled articles made from butyl ionomers having certain physical properties.

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene (1-5 mole %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises a major portion of isoolefin and a minor amount, usually not more than 2.5 mol %, of a conjugated multiolefin. Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages'288-295.

Halogenation of this butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A23 I Editors Elvers, et al.) and/or "Rubber Technology" (Third Edition) by Maurice Morton, Chapter 10 (Van Nostrand Reinhold Company © 1987), particularly pp. 297-300.

The presence of allylic halide functionalities allows for nucleophilic alkylation reactions. It has been recently shown that treatment of brominated butyl rubber (BIIR) with nitrogen and/or phosphorus based nucleophiles, in the solid state, leads to the generation of IIR-based ionomers with interesting physical and chemical properties (see: Parent, J. S.; Liskova, A.; Whitney, R. A; Resendes, R. *Journal of Polymer Science, Part A*: Polymer Chemistry 43, 5671-5679, 2005; Parent, J. S.; Liskova, A.; Resendes, R. *Polymer* 45, 8091-8096, 2004; Parent, J. S.; Penciu, A.; Guillen-Castellanos, S. A.; Liskova, A.; Whitney, R. A. *Macromolecules* 37, 7477-7483, 2004). The ionomer functionality is generated from the reaction of a nitrogen or phosphorous based nucleophile and the allylic halide sites in the halogenated butyl rubber to produce a ammonium or phosphonium ionic group respectively. The physical properties of these halogenated butyl based ionomers, such as green strength, modulus, filler interactions etc., are superior to those of their non-ionomeric counterpart.

It has been discovered that the addition of para-methylstyrene to the mixed feed of butyl polymerizations (MeCl, IB and IP mixed feed, with $AlCl_3/H_2O$ as initiator) results in a high molecular weight polymer with up to 10 mol % of styrenic groups randomly incorporated along the polymer chain (See: U.S. Pat. No. 6,960,632; Kaszas et al. *Rubber Chemistry and Technology*, 2001, 75, 155). The incorporation of para-methylstyrene is found to be uniform throughout the molecular weight distribution due to the similarity in reactivity with isobutylene. The isoprene moieties within the butyl terpolymers can be halogenated by conventional methods leading to similar Type II and Type III allylic halide structures as the current LANXESS halobutyl grades.

Alternatively, a butyl copolymer may comprise a $C_4$-$C_7$ isomonoolefin, such as isobutylene, and a comonomer, such as para-alkylstyrene, preferably para-methylstrene. When halogenated, some of the alkyl substituent groups present in the styrene monomer units contain a benzylic halogen. Additional functional groups can be incorporated by nucleophilic displacement of the benzylic halogen with a variety of nucleophiles as described in U.S. Pat. No. 5,162,445. Use of tertiary amines and phosphines results in the formation of butyl ionomers based on these copolymers with improved physical properties.

Conventional butyl polymers, including halobutyl, suffer from the disadvantage that, in order to take full advantage of their properties, they need to be crosslinked though curing or vulcanization. However, once the covalent crosslinks are formed through conventional methods (ie. vulcanization), the polymer compounds are no longer reprocessable or remoldable and any leftover material formed in manufacturing is of no use to the manufacturer, must be disposed of, and can be a significant cost to the manufacturer.

Various investigations have been initiated into producing polymers, namely ionic polymers, which behave similar to covalently crosslinked polymers at room temperature but at higher temperatures, are readily remoldable. This is achievable as ionic polymers are crosslinked via ionic bonding versus covalent bonding as in normal vulcanized rubbers. Ionic bonds, or clusters, are known to be disrupted by the action of shear or heat, while the covalent bonds of more conventional cure systems (vulcanization) are essentially permanent links between polymer chains.

U.S. Pat. No. 3,646,166 describes a method to introduce carboxylic acid groups into a butyl rubber backbone. This is accomplished in a multistep solution reaction of dehalogenation of halobutyl to form a conjugated diene, followed by reaction with maleic anhydride which is then hydrolyzed and reacted with a metallic salt or amine to form an ionic polymer that could be remolded with good physical properties.

U.S. Pat. No. 3,898,253 describes a remoldable butyl rubber composition formed by first combining a halobutyl rubber with selected filler (silica, talc or calcium carbonate) on a warmed mill followed by the addition of an alkyl tertiary amine on a cooled mill and then molded in a press at 175° C. to allow the amine to react with the rubber. The resulting compound was then re-heated on the mill at 175° C., and re-molded resulting in compounds that retained some physical properties however in most cases, these physical properties were reduced by at least half.

U.S. Pat. Nos. 4,102,876 and 4,173,695 describe the formation of ionomers based on EPDM and low molecular weight butyl formed via a multistep process in which sulfonation of the polymer occurs followed by quaternization with phosphonium or ammonium compounds. The resulting ionomers have the anionic group attached to the backbone and the cationic group as the counterion.

The examples outlined above, while displaying remoldable properties suffer from disadvantages related to long production times to form the remoldable polymer (U.S. Pat. No. 3,898,253) or involve multistep synthesis (U.S. Pat. Nos. 3,646,166 and 4,173,695). Additionally, in most cases there was not an excellent retention of the original physical properties.

Polymer nanocomposites is a rapidly expanding, multidisciplinary field that represents a radical alternative to conventional-filled polymers or polymer blends. Polymer nanocomposites are formed by the incorporation of nanosized inorganic fillers into a polymer matrix. Hybrid materials reinforced with neat and/or organically modified high aspect ratio plate-like fillers represent the most widely studied class of nanocomposites. Strong interfacial interactions between the dispersed layers and the polymer matrix lead to enhanced mechanical and barrier properties over the conventional composite. Maximizing high aspect ratio fillers to their highest potential requires the correct morphology, making the selection of both the polymer and the filler critical. Polymer intercalation into the platelet galleries, delamination and exfoliation of the platelet and the anisotropic alignment of plates in the rubber matrix must be achieved. In order to accomplish at the very least the intercalation and delamination, it is advantageous to establish a chemical link between the polymer matrix and the filler surface.

U.S. application Ser. No. 11/88,172 discloses polymers, polymer compounds and composite articles made therefrom comprising maleic anhydride grafted butyl polymers and montmorillonite having surprising adhesive properties. And PCT/CA/200700425 discloses a polymerization process for preparing silica-filled butyl rubber polymers wherein quaternary onium-ion substituted nanoclays are dispersed in the organic polymerization fluid prior to initiating polymerization.

SUMMARY OF THE INVENTION

The present invention provides an uncured, remoldable polymer composite comprising: a butyl ionomer comprising repeating units derived from at least one isoolefin monomer, repeating units derived from at least one multiolefin monomer, optionally at least one monomer copolymerizable with the isoolefin or multiolefin monomer, and at least one nitrogen or phosphorous based nucleophile; and, a filler incorporated with the butyl ionomer. In one embodiment, the filler comprises a high aspect ratio filler, for example a nanoclay having an aspect ratio of at least 1:3, preferably an onium substituted nanoclay. In another embodiment, the filler comprises silica. The composite may be thermo-reversible, may have a Mooney viscosity ML (1+8) @ 125° C. of at least 25 Mooney units and may have an ultimate tensile strength of at least 2 MPa. The butyl ionomer may be partially halogenated.

The present invention further provides a process for recycling a molded article comprising an uncured butyl ionomer material, the process comprising: converting the article to particles having an average size of at most 50 mm; heating the particles to a temperature of from 70 to 190° C.; exposing the particles to shear mixing conditions for at least 10 seconds; and, cooling the resulting mixture to ambient temperature. The shear mixing conditions may be provided by an internal mixer or an extruder. Preferably, the temperature is in the range of from 110 to 170° C.

The present invention further provides a process for preparing a recycled butyl ionomer material, the process comprising: providing a non-recycled uncured butyl ionomer material having a ultimate tensile strength at ambient temperature; heating the butyl ionomer to a temperature of from 70 to 190° C.; exposing the butyl ionomer to shear mixing conditions for at least 10 seconds; and, cooling the butyl ionomer to ambient temperature to form the recycled butyl ionomer.

The present invention further provides a shaped article comprising a recycled butyl ionomer. The shaped article may exhibits less than 20% decrease in ultimate tensile strength as compared with an identical shaped article made from a non-recycled butyl ionomer that is otherwise identical in composition to the recycled butyl ionomer. The shaped article may be made from a recycled butyl ionomer that is partially halogenated.

The present invention further provides a composite comprising a recycled butyl ionomer and a filler. The composite may exhibit less than 20% decrease in ultimate tensile strength as compared with a composite made from a non-recycled butyl ionomer that is otherwise identical in composition to the recycled butyl ionomer. The composite may be uncured. The composite may contain less than 50% by weight non-recycled butyl ionomer, preferably less than 10%. The recycled butyl ionomer may be partially halogenated. The filler may comprise a high aspect ratio filler, for example a nanoclay having an aspect ratio of at least 1:3, preferably an onium substituted nanoclay. In another embodiment, the filler may comprise silica.

The butyl ionomer composites of the present invention have improved tensile strength as compared to uncured traditional butyl rubber composites and properties that are at least comparable to sulfur-cured butyl rubber composites. The ionomers exhibit very little decrease in tensile strength and molecular weight upon recycling, due at least in part to the recycling process conditions chosen. The composites of the present invention are particularly useful in articles, for example, shaped or molded articles, barrier applications, tank linings, shock absorbers, seals and biomedical applications.

DETAILED DESCRIPTION

The butyl ionomer is prepared from a halogenated butyl polymer. Butyl polymers are generally derived from at least one isoolefin monomer, at least one multiolefin monomer and optionally further copolymerizable monomers.

The butyl polymer is not limited to a special isoolefin. However, isoolefins within the range of from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene (isobutylene).

The butyl polymer is not limited to a special multiolefin. Every multiolefin copolymerizable with the isoolefin known by the skilled in the art can be used. However, multiolefins with in the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof, preferably conjugated dienes, are used. Isoprene is more preferably used. The butyl polymer useful in the present invention may include a co-monomer other than the above referenced multiolefins, such as an alkyl-substituted vinyl aromatic co-monomer, including but not limited to a $C_1$-$C_4$ alkyl substituted styrene, for example para-methylstyrene.

As optional monomers, any monomer copolymerizable with the isoolefins and/or dienes known by the skilled in the art can be used. α-methyl styrene, p-methyl styrene, chlorostyrene, cyclopentadiene and methylcyclopentadiene are preferably used. Indene and other styrene derivatives may also be used. β-pinene can also be used as a co-monomer for the isoolefin. The butyl polymer can include, for example, random copolymers of isobutylene, isoprene and para-methylstryene.

Preferably, the monomer mixture comprises from about 80% to about 99% by weight of an isoolefin monomer and from about 1% to 20% by weight of a multiolefin monomer. More preferably, the monomer mixture comprises from about 85% to about 99% by weight of an isoolefin monomer and from about 1% to 15% by weight of a multiolefin monomer. If the monomer mixture comprises the optional monomer copolymerizable with the isoolefins and/or dienes, the monomer mixture preferably comprises from about 80% to about 99% by weight of a monomer, from about 0.5% to about 5% by weight of a multiolefin monomer and from about 0.5% to about 15% by weight of the optional monomer. More preferably, the monomer mixture comprises from about 85% to about 99% by weight of an isoolefin monomer, from about 0.5% to about 5% by weight of a multiolefin monomer and from about 0.5% to about 10% by weight of the optional monomer.

The butyl polymer can then be subjected to a halogenation process in order to produce a halobutyl polymer. Bromination or chlorination can be performed according to the process known by those skilled in the art, for example, the procedures described in Rubber Technology, 3rd Ed., Edited by Maurice Morton, Kluwer Academic Publishers, pp. 297-300 and further documents cited therein.

The butyl ionomer can be prepared from a halogenated butyl polymer having from 1.2 to 2.2 mol % of the multiolefin monomer. Additionally, the ionomer can be prepared from a halogenated butyl polymer having a higher multiolefin content, for example greater than 2.5 mol %, preferably greater than 3.5 mol %, more preferably greater than 4.0 mol %. The preparation of a suitable high multiolefin butyl polymer is described in co-pending application CA 2,418,884, which is incorporated herein by reference.

During halogenation of a butyl polymer containing conjugated dienes, such as isoprene, some or all of the multiolefin content of the butyl polymer is converted to allylic halides. The total allylic halide content of the halobutyl polymer may not exceed the starting multiolefin content of the parent butyl polymer. The allylic halide sites allow for reacting with and attaching a nucleophile to the halobutyl polymer. For halobutyl polymers containing no allylic halides, for example, halobutyl polymers derived from isobutylene and styrenic monomers, benzylic halides, formed by halogenation of the styrenic monomer, may be reacted to form the ionomer rather than allylic halides. The same logic would therefore apply to benzylic halides as allylic halides; the total amount of ionomeric moieties cannot exceed the available amount of benzylic halides.

In one embodiment of the present invention, the allylic halide or benzylic halide sites of the halobutyl polymer are reacted with at least one nitrogen or phosphorus containing nucleophile having the following formula,

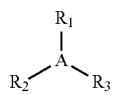

wherein:
A is a nitrogen or phosphorus; and,
$R_1$, $R_2$ and $R_3$ are selected from the group consisting of linear or branched $C_1$-$C_{18}$ alkyl substituents, an aryl substituent which is monocyclic or composed of fused $C_4$-$C_8$ rings, and/or a hetero atom selected from, for example, B, N, O, Si, P, and S.

In general, the appropriate nucleophile will contain at least one neutral nitrogen or phosphorus center which possesses a lone pair of electrons which is both electronically and sterically accessible for participation in nucleophilic substitution reactions. Suitable nucleophiles include trimethylamine, triethylamine, triisopropylamine, tri-n-butylamine, trimethylphosphine, triethylphosphine, triisopropylphosphine, tri-n-butylphosphine, triphenylphosphine 2-dimethylaminoethanol, 1-dimethylamino-2-propanol, 2-(isopropylamino)ethanol, 3-dimethylamino-1-propanol, N-methyldiethanolamine, 2-(diethylamino)ethanol, 2-dimethylamino-2-methyl-1-propanol, 2-[2-(dimethylamino)ethoxy]ethanol, 4-(dimethylamino)-1-butanol, N-ethyldiethanolamine, triethanolamine, 3-diethylamino-1-propanol, 3-(diethylamino)-1,2-propanediol, 2-{[2-(dimethylamino)ethyl]methylamino}ethanol, 4-diethylamino-2-butyn-1-ol, 2-(diisopropylamino)ethanol, N-butyldiethanolamine, N-tert-butyldiethanolamine, 2-(methylphenylamino)ethanol, 3-(dimethylamino)benzyl alcohol, 2-[4-(dimethylamino)phenyl]ethanol, 2-(N-ethylanilino)ethanol, N-benzyl-N-methylethanolamine, N-phenyldiethanolamine, 2-(dibutylamino)ethanol, 2-(N-ethyl-N-m-toluidino)ethanol, 2,2'-(4-methylphenylimino)diethanol, tris[2-(2-methoxyethoxy)ethyl]amine, and 3-(dibenzylamino)-1-propanol and mixtures thereof.

The amount of nucleophile reacted with the butyl polymer may be in the range of from 0.05 to 5 molar equivalents, more preferably 0.5 to 4 molar equivalents and even more preferably 1 to 3 molar equivalents based on the total molar amount of allylic or benzylic halide present in the halobutyl polymer.

The halobutyl polymer and the nucleophile can be reacted for about 0.5 to 90 minutes. When the reaction takes place in an extruder, the reaction is preferably from 10 to 120 seconds minutes, more preferably from 20 to 60 seconds. When the reaction takes place in an internal mixer, the reaction is preferably from 1 to 15 minutes, more preferably from 1 to 4 minutes. In other cases, the reaction takes considerably longer, for example from greater than 15 to 90 minutes, preferably 20 to 60 minutes. A temperature range of 80 to 200° C. is desirable.

As stated above, the nucleophile reacts with the allylic or benzylic halide functionality of the halobutyl polymer resulting in units of ionomeric moieties where the allylic or benzylic halide functionality existed on the halobutyl polymer. The total content of ionomeric moiety in the butyl ionomer may not exceed the starting amount of allylic or benzylic halide in the halobutyl polymer; however, residual allylic halides, benzylic halides and/or residual multiolefins may be present. In embodiments of the present invention where substantially all of the allylic or benzylic halides sites are reacted with the nucleophile, a butyl ionomer is formed. In embodiments where less than all the allylic or benzylic halide sites are reacted with the nucleophile, a partially halogenated butyl ionomer is formed.

The resulting ionomers preferably possess at least 0.5 mol %, preferably at least 0.75 mol %, more preferably at least 1.0 mol %, yet more preferably at least 1.5 mol % of the ionomeric moiety. Residual allylic halides may be present in an amount of from 0.1 mol % up to an amount not exceeding the original allylic halide content of the halobutyl polymer used to produce the butyl ionomer. Residual multiolefin may be present in an amount of from 0.1 mol % up to an amount not exceeding the original multiolefin content of the butyl polymer used to produce the halobutyl polymer. Typically, the residual multiolefin content of the ionomer is at least 0.4 mol %, preferably at least 0.6 mol %, more preferably at least 1.0 mol %, yet more preferably at least 2.0 mol %, still more preferably at least 3.0 mol %, even more preferably at least 4.0 mol %.

Partially halogenated butyl ionomers may be subsequently cured using conventional curing systems, such as sulfur or zinc oxide. When residual multiolefin is also present, peroxide curing systems may be used. However, as shown herein, the ionomeric network can advantageously provide uncured articles with useful physical properties, such as ultimate tensile strength, ultimate elongation and/or Mooney viscosity. These uncured (or slightly cured) articles have the further advantage of being recyclable at elevated temperature under shear mixing conditions. Surprisingly, the recycling processes and recycled ionomers described herein exhibit little to no loss in physical properties, even over multiple recycling iterations. This makes the recycling processes and recycled ionomers highly advantageous from an environmental and economic perspective.

To recycle the uncured butyl ionomers described herein, the ionomers are provided to a shear mixing apparatus capable of elevating the ionomer temperature to from 80 to 200° C., more preferably from 100 to 190° C., yet more preferably from 110 to 180° C., still more preferably from 120 to 170° C. The elevated temperature may be provided by virtue of an external heat source and/or generated due to shear mixing of the highly viscous butyl ionomer. It is desirable that the temperature be elevated sufficiently to reduce the viscosity of the ionomer to the point that it can be mixed without undue power input; however, excessively high temperature leads to molecular weight degradation of the ionomer, which results in a reduced Mooney viscosity. The above temperature ranges are especially well-suited to recycling butyl ionomers having an initial Mooney viscosity ML (1+8) @ 125° C. of 25-35 Mooney units.

The butyl ionomers are exposed to shear mixing conditions for at least 10 seconds and preferably no more than 15 minutes. The amount of time depends on the degree of shear imparted by the chosen mixing method. Use of an extruder provides a high degree of shear in a short period of time, usually from 10 to 60 seconds. Internal mixers, such as a Banbury or Haake internal mixer, typically require longer mixing times on the order of greater than one minute to 15 minutes, preferably from 1 to 10 minutes, more preferably from 1 to 5 minutes. Excessively long mixing times can lead to molecular weight degradation of the ionomer, which results in a reduced Mooney viscosity. The above mixing times are especially well-suited to recycling butyl ionomers having an initial Mooney viscosity ML (1+8) @ 125° C. of 25-35 Mooney units.

When the butyl ionomer is provided to the recycling process as a shaped or molded article, it is generally necessary to convert the article to particles in order to allow it to be fed to the shear mixing apparatus. Process to convert the article to particles include chipping, grinding, cutting or hammering processes, optionally with the aid of cryogenic freezing of the article using, for example, liquid nitrogen. It is desirable that the average particle size is at most 50 mm, preferably at most 25 mm, more preferably at most 10 mm, yet more preferably at most 1 mm. Although smaller particle size generally reduces the time required to conduct the recycling process, the energy input for large volume recycling may be cost prohibitive. The average particle size may be determined based on a Sauter mean diameter of the particle. The particles need not necessarily be circular, but may be an elongated or irregular shape.

When the recycling process is used to produce a recycled butyl ionomer from a non-recycled (or virgin) butyl ionomer, the process desirably results in minimal loss of physical properties. The ultimate tensile strength of the recycled butyl ionomer is preferably at least 60% of that of the non-recycled butyl ionomer, more preferably at least 80%, even more preferably at least 90%. The ultimate tensile strength of the non-recycled butyl ionomer is preferably at least 2 MPa, more preferably at least 3 MPa, yet more preferably at least 5 MPa, even more preferably at least 8 MPa, even more preferably at least 10 MPa. The ultimate tensile strength of the recycled ionomer is preferably at least 1 MPa, more preferably at least 2 MPa, yet more preferably at least 3 MPa, still more preferably at least 4 MPa, even more preferably at least 6 MPa, yet even more preferably at least 8 MPa, still even more preferably at least 10 MPa. When the butyl ionomer is filled, higher ultimate tensile strength is provided; this is at least in part dependent on the choice of filler and the amount of filler. The non-recycled butyl ionomer is uncured and the recycled butyl ionomer is preferably uncured to permit further iterations of recycling, but may be cured in certain instances. When the non-recycled butyl ionomer is partially halogenated, the recycled ionomer may be cured or may have its ionomeric moiety content increased by reaction with additional nitrogen or phosphorous based nucleophile, as described above. This may take place during the recycling process under elevated temperature and shear mixing conditions.

The recycling process conditions are usually selected to prevent molecular weight degradation. The recycled butyl ionomer preferably has a Mooney viscosity ML (1+8) @ 125° C. that is at least 50% of the non-recycled butyl ionomer, more preferably at least 70%, yet more preferably at least 80%.

The recycled butyl ionomer preferably has an ultimate elongation of at least 500%, more preferably at least 600%, still more preferably at least 700%.

The recycled butyl ionomer produced using the above process may be used to form shaped articles. The shaped articles may be further recyclable (i.e. thermo-reversible). The shaped articles may be filled or unfilled. The shaped articles may comprise high aspect ratio fillers. The shaped articles made from the recycled butyl ionomer may be subsequently cured, provided that there is residual halogenation present in the recycled butyl ionomer.

The recycled butyl ionomers may be used to form a filled composite. The composite desirably exhibits less than 20% decrease in ultimate tensile strength as compared with a composite made from a non-recycled butyl ionomer that is otherwise identical in composition to the recycled butyl ionomer. The composite may contain less than 50% by weight non-recycled butyl ionomer, preferably less than 10% by weight. The composite may comprise a high aspect ratio filler, for example a filler having an aspect ratio of at least 1:3. The filler may comprise a clay, for example an onium substituted nanoclay. The nanoclay may have a particle size of from 1 to 50 μm, preferably from 1 to 25 μm.

In general, fillers suitable for use in the present invention are composed of particles of a mineral or non-mineral. Suitable fillers include silica, silicates, clay (such as bentonite), gypsum, alumina, titanium dioxide, talc and the like, as well as mixtures thereof. Further examples of suitable fillers include:

highly dispersable silicas, prepared e.g. by the precipitation of silicate solutions or the flame hydrolysis of silicon halides, with specific surface areas of 5 to 1000, preferably 20 to 400 m$^2$/g (BET specific surface area), and with primary particle sizes of 10 to 400 nm; the silicas can optionally also be present as mixed oxides with other metal oxides such as Al, Mg, Ca, Ba, Zn, Zr and Ti;

synthetic silicates, such as aluminum silicate and alkaline earth metal silicate;

magnesium silicate or calcium silicate, with BET specific surface areas of 20 to 400 m$^2$/g and primary particle diameters of 10 to 400 nm;

natural silicates, such as kaolin and other naturally occurring silica;

natural clays, such as montmorillonite and other naturally occurring clays;

organophilically modified clays such as organophilically modified montmorillonite clays (e.g. Cloisite® Nanoclays available from Southern Clay Products) and other organophilically modified naturally occurring clays;

glass fibers and glass fiber products (matting, extrudates) or glass microspheres;

metal oxides, such as zinc oxide, calcium oxide, magnesium oxide and aluminum oxide;

metal carbonates, such as magnesium carbonate, calcium carbonate and zinc carbonate;

metal hydroxides, e.g. aluminum hydroxide and magnesium hydroxide or combinations thereof.

Since these mineral particles have hydroxyl groups on their surface, rendering them hydrophilic and oleophobic, it is difficult to achieve good interaction between the filler particles and the butyl elastomer. For many purposes, the preferred mineral is silica, especially silica prepared by the carbon dioxide precipitation of sodium silicate.

Dried amorphous silica particles suitable for use as mineral fillers in accordance with the present invention have a mean agglomerate particle size in the range of from 1 to 100 microns, preferably between 10 and 50 microns and more preferably between 10 and 25 microns. It is preferred that less than 10 percent by volume of the agglomerate particles are below 5 microns or over 50 microns in size. A suitable amorphous dried silica has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are commercially available under the trademarks HiSil 210, HiSil 233 and HiSil 243 available from PPG Industries Inc. Also suitable are Vulkasil S and Vulkasil N, commercially available from Bayer AG.

Mineral fillers can also be used alone or in combination with known non-mineral fillers, such as:

carbon blacks; suitable carbon blacks are preferably prepared by the lamp black, furnace black or gas black process and have BET specific surface areas of 20 to 200 m$^2$/g, for example, SAF, ISAF, HAF, FEF or GPF carbon blacks; or rubber gels, preferably those based on polybutadiene, butadiene/styrene copolymers, butadiene/acrylonitrile copolymers and polychloroprene.

High aspect ratio fillers useful in the present invention include clays, talcs, micas, etc. with an aspect ratio of at least 1:3. The fillers may include a circular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. Preferable high aspect ratio fillers have an aspect ratio of at least 1:5, more preferably at least 1:7, yet more preferably from 1:7 to 1:200. Fillers in accordance with the present invention have a mean particle size in the range of from 0.001 to 100 microns, preferably between 0.005 and 50 microns and more preferably between 0.01 and 10 microns. A suitable filler has a BET surface area, measured in accordance with DIN (Deutsche Industrie Norm) 66131, of between 5 and 200 square meters per gram. Examples of some preferred fillers and their properties are provided in Table 1 in comparison with typical fillers having aspect ratios less than 1:3.

TABLE 1

| Filler | Mean particle size (microns) | Aspect ratio | Surface Area (m$^2$/g) |
|---|---|---|---|
| Hi-Sil 233 ™ | 0.019 | 1:1 | 135 |
| Carbon Black N660 ™ | 0.067 | 1:1 | 36 |
| Cloisite ® 15A | 6 | 1:100 | 250 |

A preferred embodiment of a high aspect ratio filler comprises a nanoclay, preferably an organically modified nanoclay. The present invention is not limited to a specific nanoclay; however, natural powdered smectite clays, such as sodium or calcium montmorillonite, or synthetic clays such as hydrotalcite and laponite are preferred as starting materials. Organically modified montmorillonite nanoclays are especially preferred. The clays are preferably modified by substitution of the transition metal for an onium ion, as is known in the art, to provide surfactant functionality to the clay that aids in the dispersion of the clay within the generally hydrophobic polymer environment. Preferred onium ions are phosphorus based (eg: phosphonium ions) and nitrogen based (eg: ammonium ions) and contain functional groups having from 2 to 20 carbon atoms (eg: NR$_4^{+-}$ MMT).

The clays are preferably provided in nanometer scale particle sizes, preferably less than 25 μm by volume, more preferably from 1 to 50 μm, still more preferably from 1 to 30 μm, yet more preferably from 2 to 20 μm.

In addition to silica, the preferred nanoclays may also contain some fraction of alumina. The nanoclays may contain from 0.1 to 10 wt % alumina, preferably 0.5 to 5 wt %, more preferably 1 to 3 wt % alumina.

Examples of preferred commercially available organically modified nanoclays suitable for use as high aspect ratio fillers according to the present invention are Cloisite® clays 10A, 20A, 6A, 15A, 30B, or 25A. The high aspect ratio fillers are added to the nanocomposite in an amount of from 3 to 80 phr, more preferably from 5 to 30 phr, yet more preferably from 5 to 15 phr. The nanocomposite is formed by adding the filler to a pre-formed ionomer using conventional compounding techniques.

The composite may be formed due to recycling of a filled uncured butyl ionomer or may be formed due to recycling of a non-filled uncured butyl ionomer accompanied by subsequent introduction of filler. More than one type of filler may be provided in the composite material The ingredients of the composite may be mixed together using, for example, an internal mixer, such as a Banbury mixer, a miniature internal mixer, such as a Haake or Brabender mixer, or a two roll mill mixer. An extruder also provides good mixing, and permits shorter mixing times. It is possible to carry out the mixing in two or more stages, and the mixing can be done in different apparatus, for example one stage in an internal mixer and one stage in an extruder. For further information on compounding techniques, see Encyclopedia of Polymer Science and Engineering, Vol. 4, p. 66 et seq. (Compounding).

The composite may be formed into a shaped article, for example by molding. The article may be cured, as previously described. The composite may be provided as a masterbatch for subsequent downstream processing. The composite may be mixed with non-recycled ionomer or with a conventional halogenated or non-halogenated butyl polymer and subsequently formed into articles.

This present invention describes the formation of thermally reversible filled butyl based-compound with excellent physical properties and processes for recycling butyl ionomers. The following examples will be used to illustrate particular embodiments of the invention.

Experimental

Equipment. Hardness and stress strain properties were determined with the use of an A-2 type durometer following ASTM D-2240 requirements. The stress strain data was generated at 23° C. according to the requirements of ASTM D-412 Method A. Die C dumbbells cut from 2 mm thick tensile sheets were used; thermosets were formed in a press at 15,000 psi for a total of 30 minutes at 166° C. and ionomers were molded in a press at 15,000 psi for a total of 12 minutes at 160° C. $^1$H NMR spectra were recorded with a Bruker DRX 500 spectrometer (500.13 MHz) in $CDCl_3$ with chemical shifts referenced to tetramethylsilane.

Materials. All reagents, unless otherwise specified, were used as received from Sigma-Aldrich (Oakville, Ontario). BIIR (LANXESS BB2030™, LANXESS Inc.), Sunpar 2280™ (R. E. Carroll Inc), Pentalyn A™ (Hercules), Vulkacit DM/C™ (LANXESS Inc.), Carbon Black N660™ (Sid Richardson Carbon and Gas Companies), Cloisite 15A™ (Southern Clay Products), and Hi-Sil 233™ (PPG Industries, Inc.) were used as received from their respective suppliers.

EXAMPLE 1

Preparation IIR-PPh$_3$Br Ionomer.

356 g of LANXESS BB2030™ and 16.7 g (1.2 molar equivalents based on allylic bromide content) of triphenylphosphine (TPP) were premixed on a 6"×12" mill at room temperature for 3 minutes. The mixture was then heated on the mill at 100° C. for 1 hour. Analysis of the final product by $^1$H MNR confirmed the complete conversion of all the allylic bromide of BB2030 to the corresponding ionomeric species.

EXAMPLES 2-7

The following examples demonstrate the effect of an ionomer network on the physical properties of an unvulcanized carbon black-filled system as compared to the physical properties of a non-ionomeric system with the same formulation. Examples 2, 4 and 6 were prepared by mixing Example 1 and Carbon Black N660 in a Brabender mixer at 60° C. and a rotor speed of 60 rpm for 15 minutes. Examples 3, 5, and 7 were prepared in the same manner with the exception of using BB2030 in place of Example 1. The resulting formulations were molded and the tensile properties determined as described above. The results are tabulated in Table 2.

TABLE 2

| | Example | | | | | |
|---|---|---|---|---|---|---|
| | 2 | 3 | 4 | 5 | 6 | 7 |
| BB2030 (PHR) | — | 100 | — | 100 | — | 100 |
| Example 1 (PHR) | 100 | — | 100 | — | 100 | — |
| Carbon Black N660 (PHR) | 25 | 25 | 50 | 50 | 75 | 75 |
| Hardness Shore A2 (pts.) | 36 | 33 | 43 | 36 | 48 | 33 |
| Ultimate Tensile (MPa) | 5.65 | 0.38 | 7.40 | 0.68 | 6.40 | 0.84 |
| Ultimate Elongation (%) | 734 | 1005 | 661 | 991 | 445 | 1005 |
| M100 | 0.87 | 0.33 | 1.27 | 0.99 | 1.74 | 0.59 |
| M300 | 1.75 | 0.34 | 3.34 | 1.02 | 4.64 | 0.65 |

Table 2 illustrates that, in comparison to non-ionomeric system (Examples 3, 5 and 7), the phosphonium ionomer (Examples 2, 4 and 6) display significant improvements in tensile strength, in addition to increased reinforcement.

EXAMPLES 8-13

The following examples demonstrate the effect of an ionomer network on the physical properties of an unvulcanized silica-filled system as compared to the physical properties of a non-ionomeric system with the same formulation. Preparation of Examples 8, 10 and 12 were carried out as described above for Example 2, and Examples 9, 11 and 13 were carried out as described for Example 3. The resulting formulations were molded and the tensile properties determined as described above. The results are tabulated in Table 3.

TABLE 3

| | Example | | | | | |
|---|---|---|---|---|---|---|
| | 8 | 9 | 10 | 11 | 12 | 13 |
| BB2030 (PHR) | — | 100 | — | 100 | — | 100 |
| Example 1 (PHR) | 100 | — | 100 | — | 100 | — |
| Hi Sil 233 (PHR) | 10 | 10 | 20 | 20 | 50 | 50 |
| Hardness Shore A2 (pts.) | 23 | 14 | 38 | 30 | 53 | 43 |
| Ultimate Tensile (MPa) | 2.3 | 0.39 | 4.8 | 0.92 | 11.6 | 0.26 |
| Ultimate Elongation (%) | 839 | 1003 | 798 | 1003 | 820 | 93 |
| M100 | 0.54 | 0.26 | 0.92 | 0.48 | 1.92 | — |
| M300 | 0.85 | 0.26 | 1.5 | 0.48 | 4.27 | — |

Table 3 illustrates that, in comparison to non-ionomeric system (Examples 9, 11 and 13), the phosphonium ionomer (Examples 8, 10 and 12) display significant improvements in tensile strength, in addition to increased reinforcement.

EXAMPLES 14-19

The following examples demonstrate the effect of an ionomer network on the physical properties of an unvulcanized clay-filled system as compared to the physical properties of a non-ionomeric system with the same formulation. Preparation of Examples 14, 16 and 18 were carried out as described above for Example 2, and Examples 15, 13, and 17 were carried out as described for Example 3. The resulting formulations were molded and the tensile properties determined as described above. The results are tabulated in Table 4.

TABLE 4

| | Example | | | | | |
|---|---|---|---|---|---|---|
| | 14 | 15 | 16 | 17 | 18 | 19 |
| BB2030 (PHR) | — | 100 | — | 100 | — | 100 |
| Example 1 (PHR) | 100 | — | 100 | — | 100 | — |
| Cloisite 15A (PHR) | 5 | 5 | 10 | 10 | 15 | 15 |
| Hardness Shore A2 (pts.) | 38 | 47 | 48 | 46 | 52 | 26 |
| Ultimate Tensile (MPa) | 5.9 | 0.1 | 10.7 | 0.2 | 9.9 | 0.4 |
| Ultimate Elongation (%) | 839 | 398 | 773 | 309 | 576 | 1003 |
| M100 | 0.97 | 0.29 | 1.65 | 0.33 | 2.74 | 0.5 |
| M300 | 1.73 | 0.19 | 3.79 | 0.20 | 6.26 | 0.4 |

Table 4 illustrates that, in comparison to non-ionomeric system (Examples 15, 17 and 19), the phosphonium ionomer (Examples 14, 16 and 18) display significant improvements in tensile strength, in addition to increased reinforcement.

EXAMPLE 20

The following examples illustrate the effect of a phosphonium bromide ionomeric network on the physical properties of a non-vulcanized system as compared to the physical properties of typical, sulfur-cured thermoset. Example 20 was prepared by mixing BB2030 and Carbon Black N660 in a Banbury mixer at 30° C. and a rotor speed of 77 rpm for 1 minute, followed by the addition of the oil and accelerator, mixed for an additional 4 minutes and then dumped. The curatives (sulfur, stearic acid and zinc oxide) were then added on a two roll 10"×20" mill and at room temperature. The resulting formulations were cured and the tensile properties determined as described above. The results are tabulated in Table 5.

TABLE 5

| Example | 20 | 4 | 12 | 16 |
|---|---|---|---|---|
| BB2030 (PHR) | 100 | — | — | — |
| Example 2 (PHR) | — | 100 | 100 | 100 |
| Carbon Black N660 (PHR) | 60 | 50 | — | — |
| Hi Sil 233(PHR) | — | — | 50 | — |
| Cloisite 15A(PHR) | — | — | — | 10 |
| Pentalyn A (PHR) | 4 | — | — | — |
| Sunpar(PHR) | 7 | — | — | — |
| Vulkacit DM/C (PHR) | 1.3 | — | — | — |
| ZnO (PHR) | 1.5 | — | — | — |
| Stearic Acid (PHR) | 1 | — | — | — |
| Sulfur (PHR) | 0.5 | — | — | — |
| Hardness Shore A2 (pts.) | 51 | 43 | 53 | 48 |
| Ultimate Tensile (MPa) | 9.5 | 7.40 | 11.6 | 10.7 |
| Ultimate Elongation (%) | 761 | 661 | 820 | 773 |
| M100 | 1.77 | 1.92 | 2.74 | 1.65 |
| M300 | 4.28 | 4.27 | 6.26 | 3.79 |
| Density (g/cm$^3$) | 1.2 | 1.1 | 1.1 | 0.97 |

Table 5 illustrates that, in comparison to the standard tire inner liner formulation (Example 20), the unvulcanized phosphonium ionomer systems (Examples 4, 12, and 16) display comparable properties. In the case of the silica and clay-filled ionomeric systems, a significant improvement in ultimate tensile and ultimate elongation is observed.

EXAMPLES 21-25

The following examples display the recyclability of unvulcanized, silica-filled, phosphonium bromide butyl ionomers. Example 12 (as described above) was remixed in the Brabender for 15 minutes at a temperature of from 160-170° C., and re-molded under the same conditions to produce Example 21 (first recycle). Example 21 was then remixed and re-molded to produce Example 22 (second recycle). Example 22 was then remixed and re-molded to produce Example 23 (third recycle). Example 23 was then remixed and re-molded to produce Example 24 (fourth recycle). Example 24 was then remixed and re-molded to produce Example 25 (fifth recycle). The tensile properties are tabulated in Table 6.

TABLE 6

| | Example | | | | | |
|---|---|---|---|---|---|---|
| | 12 | 21 | 22 | 23 | 24 | 25 |
| Recycle # | | 1 | 2 | 3 | 4 | 5 |
| Hardness Shore A2 (pts.) | 53 | 51 | 48 | 47 | 45 | 43 |
| Ultimate Tensile (MPa) | 11.6 | 12.0 | 11.4 | 10.2 | 9.1 | 8.2 |
| Ultimate Elongation (%) | 820 | 727 | 811 | 815 | 761 | 673 |
| M100 | 2.74 | 1.72 | 1.5 | 1.24 | 1.18 | 1.32 |
| M300 | 6.26 | 4.96 | 4.19 | 3.2 | 3.11 | 3.15 |

Table 6 shows very good retention of tensile strength after each recycle.

EXAMPLES 26-30

The following examples display the recyclability of unvulcanized, clay-filled, phosphonium bromide butyl ionomers. Example 16 (as described above) was remixed in the Brabender for 15 minutes at a temperature of from 160-170° C., and re-molded under the same conditions to produce Example 26 (first recycle). Example 26 was then remixed and re-molded to produce Example 27 (second recycle). Example 27 was then remixed and re-molded to produce Example 28 (third recycle). Example 28 was then remixed and re-molded to produce Example 29 (fourth recycle). Example 29 was then remixed and re-molded to produce Example 30 (fifth recycle). The tensile properties are tabulated in Table 7.

TABLE 7

| | Example | | | | | |
|---|---|---|---|---|---|---|
| | 16 | 26 | 27 | 28 | 29 | 30 |
| Recycle # | | 1 | 2 | 3 | 4 | 5 |
| Hardness Shore A2 (pts.) | 48 | 46 | 44 | 44 | 43 | 41 |
| Ultimate Tensile (MPa) | 10.7 | 10.4 | 9.5 | 8.4 | 7.9 | 6.8 |
| Ultimate Elongation (%) | 773 | 689 | 649 | 672 | 673 | 557 |
| M100 | 1.65 | 1.52 | 1.43 | 1.23 | 1.23 | 1.24 |
| M300 | 3.79 | 4.14 | 3.84 | 3.19 | 3.24 | 3.03 |

Table 7 shows very good of tensile strength after each recycle.

EXAMPLES 31-35

Butyl terpolymers were prepared by methods described in Kaszas, U.S. Pat. No. 6,960,632; Kaszas et al. Rubber Chemistry and Technology, 2001 75, 155. The final product had 10 mol % pMeSt and 2 mol % IP, which was brominated using standard methods (Br$_2$ in hexanes) to yield a brominated butyl terpolymer with 0.8 mol % allylic bromide and a Mooney Viscosity of 30 MU. The amount of allylic bromide and residual 1,4 isoprene is similar to the commercial grade of BB2030. The resulting brominated terpolymer was then reacted with dimethylaminoethanol (3.2 molar equivalents) in a twin screw extruder at 160° C. Analysis of the final product by $^1$H NMR confirmed complete conversion of all the allylic bromide to the corresponding ionomeric species. High Sil 233 (50 phr) was then incorporated in a Brabender mixer at 60° C. and a rotor speed of 60 rpm for 15 minutes. Example 31 (as described above) was remixed in the Brabender for 15 minutes at a temperature of from 160-170° C., and re-molded under the same conditions to produce Example 32 (first recycle). Example 32 was then remixed and re-molded to produce Example 33 (second recycle). Example 33 was then remixed and re-molded to produce Example 34 (third recycle). Example 34 was then remixed and re-molded to produce Example 35 (fourth recycle). The tensile properties are tabulated in Table 8.

TABLE 8

| Example | 31 | 32 | 33 | 34 | 35 |
|---|---|---|---|---|---|
| Recycle # | | 1 | 2 | 3 | 4 |
| Hardness Shore A2 (pts.) | 55 | 45 | 44 | 43 | 39 |
| Ultimate Tensile (MPa) | 10 | 6.1 | 6 | 6.1 | 4.5 |
| Ultimate Elongation (%) | 784 | 729 | 823 | 864 | 976 |
| M100 | 1.89 | 1.11 | 0.96 | 1.02 | 0.9 |
| M300 | 4.23 | 2.5 | 2.4 | 2.36 | 2.38 |

Table 8 shows good retention of tensile strength after each recycle.

EXAMPLES 36-41

The following examples will demonstrate the effect of an ionomer network on the physical properties of unvulcanized mineral fillers systems compared to the physical properties of non-ionomeric systems with the same formulation. Preparation of Examples 36, 38, and 40 were carried out as described above for Example 2, and Examples 37, 39, and 41 were carried out as described for Example 3. The resulting formulations were molded and the tensile properties determined as described above. The results are tabulated in Table 9.

TABLE 9

| | Example | | | | | |
|---|---|---|---|---|---|---|
| | 36 | 37 | 38 | 39 | 40 | 41 |
| BB2030 (PHR) | — | 100 | — | 100 | — | 100 |
| Example 1 (PHR) | 100 | — | 100 | — | 100 | — |
| talc (PHR) | 50 | 50 | — | — | 30 | 30 |
| CaCO3 | — | — | 60 | 60 | — | — |
| Carbon Black | — | — | — | — | 30 | 30 |
| Hardness Shore A2 (pts.) | 48 | 30 | 38 | 22 | 54 | 34 |
| Ultimate Tensile (MPa) | 3.18 | 0.38 | 3.19 | 0.26 | 4.00 | 0.46 |
| Ultimate Elongation (%) | 388 | 2174 | 1102 | 945 | 591 | 2053 |
| M100 | 1.55 | 0.38 | 0.61 | 0.25 | 1.69 | 0.46 |
| M300 | 2.94 | 0.33 | 1.03 | 0.28 | 2.96 | 0.37 |

EXAMPLES 42-47

The following examples demonstrate the effect of increased ionomer content on the polymer backbone on the physical properties of unvulcanized, silica filled systems. 356 g of LANXESS BB2030 was combined with 3.5 g (Example 42), 7.0 g (Example 43) and 10.5 g (Example 44) of PPh₃ to react with ~25%, 50% and 75% of the allylic bromide functionality respectively on a room temperature mill for 3 min. The mixture was then passed through a miniature twin screw extruder (160° C., 20 rpm) and then refined on a room temperature mill. The ionomers were characterized by NMR analysis to determine the amount of ionomeric groups along the polymer backbone. Examples 45-47 were prepared by mixing Examples 42-44 and Hi Sil 233 in a Brabender mixer at 60° C. and a rotor speed of 60 rpm for 15 minutes. The resulting formulations were molded and the tensile properties determined as described above. The results are tabulated in Table 10.

TABLE 10

| Example | 12 | 13 | 45 | 46 | 47 |
|---|---|---|---|---|---|
| BB2030 (PHR) | — | 100 | — | — | — |
| Example 1 (PHR) | 100 | — | — | — | — |
| 25% of ionomers | — | — | 100 | — | — |
| 50% of ionomers | — | — | — | 100 | — |
| 75% of ionomers | — | — | — | — | 100 |
| Hi Sil 233 (PHR) | 50 | 50 | 50 | 50 | 50 |
| Hardness Shore A2 (pts.) | 53 | 43 | 61 | 59 | 57 |
| Ultimate Tensile (MPa) | 11.6 | 0.26 | 6.6 | 6.8 | 6.6 |
| Ultimate Elongation (%) | 820 | 93 | 362 | 437 | 390 |
| M100 | 1.92 | — | 2.26 | 2.00 | 2.32 |
| M300 | 4.27 | — | 5.59 | 5.02 | 5.43 |

EXAMPLE 48

Preparation of the IIR-N(CH₂CH₂OH)₃Br Ionomer. LANXESS BB2030 was fed into a miniature twin screw extruder (160° C., 20 rpm) with N,N-dimethylaminoalcohol (3.22 molar equivalents based on allylic bromide content). The extrudate was refined on the mill and analyzed by NMR, confirming the complete conversion of all the allylic bromide of BB2030 to the corresponding ionomeric species.

EXAMPLES 49-51

The following examples demonstrate the effect of an ammonium based ionomeric network on the compound properties of filled, uncured materials with various mineral fillers. Examples 49, 50 and 51 were prepared by mixing Example 48 and Carbon Black N660, Hi Sil 233 and Cloisite 15A, respectively, in a Brabender mixer at 60° C. and rotor speed of 60 rpm for 15 minutes. The resulting formulations were molded and the tensile properties are listed in Table 11.

TABLE 11

| | Example | | | | | |
|---|---|---|---|---|---|---|
| | 5 | 49 | 13 | 50 | 17 | 51 |
| BB2030 (PHR) | 100 | — | 100 | — | 100 | — |
| Example 48 (PHR) | — | 100 | — | 100 | — | 100 |
| Hi Sil 233 (PHR) | | | 50 | 50 | | |
| Cloisite 15A | | | | | 10 | 10 |
| Carbon Black N660 | 50 | 50 | | | | |
| Hardness Shore A2 (pts.) | 36 | 55 | 43 | 63 | 46 | 41 |
| Ultimate Tensile (MPa) | 0.68 | 6.71 | 0.26 | 5.08 | 0.2 | 3.86 |
| Ultimate Elongation (%) | 991 | 261 | 93 | 158 | 309 | 327 |
| M100 | 0.99 | 2.40 | — | 2.80 | 0.33 | 1.17 |
| M300 | 1.02 | — | — | — | 0.20 | 3.84 |

EXAMPLE 52

Preparation of Phosphonium Ionomer Based on Brominated isobutylene p-methylstyrene copolymer (BIMS) 150 g of Exxpro 3435 was combined with 10 g of PPh$_3$ on a room temperature mill for 3 min. The mixture was then passed through a miniature twin screw extruder (160° C., 20 rpm) and then refined on a room temperature mill. Analysis of the resulting material by NMR confirmed the complete conversion of the benzylic bromide groups of Exxpro 3435 to the corresponding ionomeric species.

EXAMPLE 53

Preparation of the Ammonium Ionomer Based on Brominated isobutylene p-methylstyrene copolymer (BIMS). Exxpro 3435 fed into a miniature twin screw extruder (160° C., 20 rpm) with N,N-dimethylaminoalcohol (3.22 molar equivalents based on allylic bromide content). The extrudate was refined on the mill and analyzed by NMR, confirming the complete conversion of all the benzylic bromide of BB2030 to the corresponding ionomeric species.

EXAMPLES 54-57

The following examples demonstrate the effect of an ionomeric network on the compound properties of filled, uncured materials with various mineral fillers. All mixtures were formed in a Brabender mixer at 60° C. and rotor speed of 60 rpm for 15 minutes. Examples 54 and 55 were prepared by mixing Exxpro 3435 and Example 52 respectively with Carbon Black N660. Examples 56 and 57 were prepared by mixing Exxpro 3435 and Example 52 respectively with Hi Sil 233 and Carbon Black N660. The resulting formulations were molded and the tensile properties are listed in Table 12.

TABLE 12

| Example | 54 | 55 | 56 | 57 |
|---|---|---|---|---|
| Exxpro 3435 (PHR) | 100 | — | 100 | — |
| Example 52 (PHR) | — | 100 | — | 100 |
| Example 53 (PHR) | — | — | — | — |
| Hi Sil 233 (PHR) | 50 | 50 | 30 | 30 |
| Carbon Black N660 | — | — | 30 | 30 |
| Hardness Shore A2 (pts.) | 55 | 67 | 55 | 55 |
| Ultimate Tensile (MPa) | 2.00 | 6.60 | 1.02 | 7.69 |
| Ultimate Elongation (%) | 550 | 289 | 1199 | 378 |
| M100 | 1.32 | 3.78 | 0.99 | 2.75 |
| M300 | 1.92 | — | 1.02 | 5.80 |

Although the invention has been described in detail in the foregoing for purposes of illustration, it is understood that such detail is solely for that purpose and that variations can be made therein by those skilled in the art without departing from the spirit and scope of the invention except as it may be limited by the claims.

What is claimed:

1. A process for preparing a recycled butyl ionomer material, the process comprising:
   a. providing a virgin uncured butyl ionomer material having a ultimate tensile strength at ambient temperature and having an initial Mooney visocosity ML (1+8) @ 125° C. of 25-35 Mooney units;
   b. heating the butyl ionomer to a temperature of from 80 to 200 ° C.;
   c. exposing the butyl ionomer to shear mixing conditions in an extruder for at least 10 to 60 seconds; and,
   d. cooling the butyl ionomer to ambient temperature to form the recycled butyl ionomer, wherein the recycled butyl ionomer is processible into thermo-reversible shaped articles.

2. The process according to claim 1, wherein the recycled butyl ionomer has an ultimate tensile strength that is at least 60% of the ultimate tensile strength of the virgin butyl ionomer.

3. The process according to claim 1, wherein the ultimate tensile strength of the virgin butyl ionomer is at least 10 MPa.

4. The process according to claim 1 wherein the ultimate tensile strength of the recycled butyl ionomer is at least 6 MPa.

5. The process according to claim 1, wherein the virgin butyl ionomer is filled.

6. The process according to claim 1, wherein the recycled butyl ionomer is uncured.

7. The process according to claim 1, wherein the virgin butyl ionomer is partially halogenated.

8. The process according to claim 7, wherein the process further comprising adding a nitrogen or phosphorous based nucleophile while exposing the butyl ionomer to shear mixing conditions.

9. The process according to claim 8, wherein content of ionomeric moieties in the recycled butyl ionomer is greater than content of ionomeric moieties in the virgin butyl ionomer.

10. The process according to claim 1, wherein the process further comprises molding the recycled butyl ionomer to form an article.

11. The process according to claim , wherein the Mooney viscosity ML (1+8) @ 125 ° C. of the recycled butyl ionomer is at least 70% of the Mooney viscosity of the virgin butyl ionomer.

* * * * *